US 11,755,534 B2

(12) United States Patent
Hsu

(10) Patent No.: US 11,755,534 B2
(45) Date of Patent: Sep. 12, 2023

(54) DATA CACHING METHOD AND NODE BASED ON HYPER-CONVERGED INFRASTRUCTURE

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 248 days.

(21) Appl. No.: 16/934,048

(22) Filed: Jul. 21, 2020

(65) Prior Publication Data

US 2021/0026809 A1    Jan. 28, 2021

Related U.S. Application Data

(63) Continuation of application No. 15/432,753, filed on Feb. 14, 2017, now Pat. No. 11,436,347.

(30) Foreign Application Priority Data

Jul. 26, 2019    (TW) ................................ 108126666

(51) Int. Cl.
*G06F 7/00*      (2006.01)
*G06F 16/172*     (2019.01)
(Continued)

(52) U.S. Cl.
CPC .......... *G06F 16/172* (2019.01); *G06F 16/144* (2019.01); *G06F 16/156* (2019.01);
(Continued)

(58) Field of Classification Search
CPC .. G06F 16/144; G06F 16/1824; G06F 16/156; G06F 16/172; G06F 18/214; G06N 20/00
(Continued)

(56) References Cited

U.S. PATENT DOCUMENTS

2018/0034908 A1   2/2018   Li
2019/0065621 A1   2/2019   Boles et al.
(Continued)

FOREIGN PATENT DOCUMENTS

CN       103020258       4/2013
CN       205680247       11/2016
(Continued)

OTHER PUBLICATIONS

Taiwan Intellectual Property Office, "Notice of allowance" dated Oct. 19, 2020.

*Primary Examiner* — Md I Uddin
(74) *Attorney, Agent, or Firm* — WPAT, P.C

(57) ABSTRACT

A data caching method, a node, a machine learning framework and a file system client based on hyper-converged infrastructure are provided. In the data caching method, a computing program requests a computing node to prefetch computing data prior to using the computing data. Then, the computing node acquires and stores the computing data in a cache memory as requested by the computing program. Subsequently, as the computing program requests the computing node to discard the computing data, the computing node discards the computing data from the cache memory as requested by the computing program.

10 Claims, 4 Drawing Sheets

(51) Int. Cl.
   *G06F 16/14*   (2019.01)
   *G06N 20/00*   (2019.01)
   *G06F 16/182*  (2019.01)
   *G06F 18/214*  (2023.01)
(52) U.S. Cl.
   CPC ........ *G06F 16/1824* (2019.01); *G06F 18/214* (2023.01); *G06N 20/00* (2019.01)
(58) Field of Classification Search
   USPC .................. 707/608, 736, 740, 769, 822
   See application file for complete search history.

(56) References Cited

U.S. PATENT DOCUMENTS

2019/0391920 A1* 12/2019 Gupta .................... G06N 20/00
2020/0192811 A1*  6/2020 Harnik ................ G06F 12/0897

FOREIGN PATENT DOCUMENTS

| TW | 201804336 | 2/2018 |
| TW | 201913416 | 4/2019 |

* cited by examiner

DATA CACHING METHOD AND NODE BASED ON HYPER-CONVERGED INFRASTRUCTURE

FIELD OF THE INVENTION

The present disclosure relates to a data caching method, and particularly to a data caching method, a node, a machine learning framework and a file system client based on hyper-converged infrastructure.

BACKGROUND OF THE INVENTION

Hyper-converged infrastructure (HCI) is a system which consolidates machines to provide a virtual file server center. In the system, a plurality of machines having respective storage devices are integrated together. To provide external devices with resources as requested, these machines take the virtual machine as the core and manage the hardware by a single software-defined scheme. The market of the hyper-converged infrastructure is increasing because complex hardware scheduling is not needed and it simplifies the management of the system.

In addition to serving as a file server system, the respective machines can provide their computing power to perform other services, for example, executing virtual machine (VM) software or performing machine learning training. In instances such as executing a training program of machine learning (e.g. deep learning), the machine responsible for the training requires a huge amount of training data. These training data may be distributed in various machines other than the training machine. Thus, it takes much time for the training machine to acquire the designated training data from other machines. It is desired to reduce the overall data-acquiring time to optimize the training process. To speed up the data acquisition, a common method is using cache software which decides whether to store the accessed data and adjacent data into a cache memory according to the access frequency of the data. However, the training data required by the machine learning have properties of large quantity, great data access repetitiveness and unpredictable data usage sequence in every repetition. Therefore, how to put the data into the cache memory in advance to assist with efficient data access and which data could be removed form the cache memory to free the space for other cache data are important issues to be discussed.

SUMMARY OF THE INVENTION

An aspect of the present disclosure provides a data caching method based on a hyper-converged infrastructure including a plurality of nodes. A computing node executes a computing program and prefetches computing data required for executing the computing program from a data node. The computing node includes a cache memory having a higher read/write speed than a hard disk drive. In the data caching method, the computing program requests the computing node to prefetch the computing data before using the computing data. The computing node acquires the computing data from the data node and stores the computing data in the cache memory as requested by the computing program. Further, in the data caching method, the computing program requests the computing node to discard the computing data when the computing data stored in the cache memory has no use for the computing program. The computing node discards the computing data from the cache memory as requested by the computing program.

In an embodiment, the computing program is a machine learning training program.

In an embodiment, the computing program calls a function provided by a machine learning framework to communicate with a file system client operating in the computing node.

In an embodiment, the machine learning framework provides a cache population function. When the computing program calls the cache population function and provides a population parameter, the machine learning framework requests the file system client to store the computing data corresponding to the population parameter in the cache memory. In addition, the machine learning framework provides a cache discard function wherein when the computing program calls the cache discard function and provides a discard parameter, the machine learning framework requests the file system client to discard the computing data corresponding to the discard parameter from the cache memory.

In an embodiment, the computing data corresponding to the population parameter includes a complete file, all files and subdirectory content in a directory or all files listed in a file-listing document.

In an embodiment, the file system client stores the computing data in the cache memory in response to a cache population function. The computing data includes a complete file, all files and subdirectory content in a directory or all files listed in a file-listing document. In addition, the file system client discards the computing data from the cache memory in response to a cache discard function. The computing data includes the complete file, the files and subdirectory content in the directory or the files listed in the file-listing document.

In an embodiment, the computing program sends a request signal to a file system client operating in the computing node to request the file system client to prefetch the computing data into the cache memory according to the request signal.

In an embodiment, the computing program sends a request signal to a file system client operating in the computing node to request the file system client to discard the computing data from the cache memory according to the request signal.

Another aspect of the present disclosure provides a node based on a hyper-converged infrastructure including a processing module, a data transmission interface module and a cache memory. The processing module executes a computing program which reads and processes computing data. The data transmission interface module is electrically coupled to the processing module and the cache memory. Before the computing program uses the computing data, the computing program requests the processing module to prefetch the computing data so that the processing module acquires the computing data from a storage device through the data transmission interface module, and stores the computing data in the cache memory through the data transmission interface module. When the computing data stored in the cache memory has no use for the computing program, the computing program requests the processing module to discard the computing data so that the processing module discards the computing data from the cache memory through the data transmission interface module as requested by the computing program.

In an embodiment, the storage device is located in the node. Alternatively, the storage device and the node are separately located.

In an embodiment, the cache memory includes at least one solid state disk. Further, the at least one solid state disk forms a disk array.

In an embodiment, the cache memory includes at least one storage class memory. Further, the at least one storage class memory forms a disk array.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
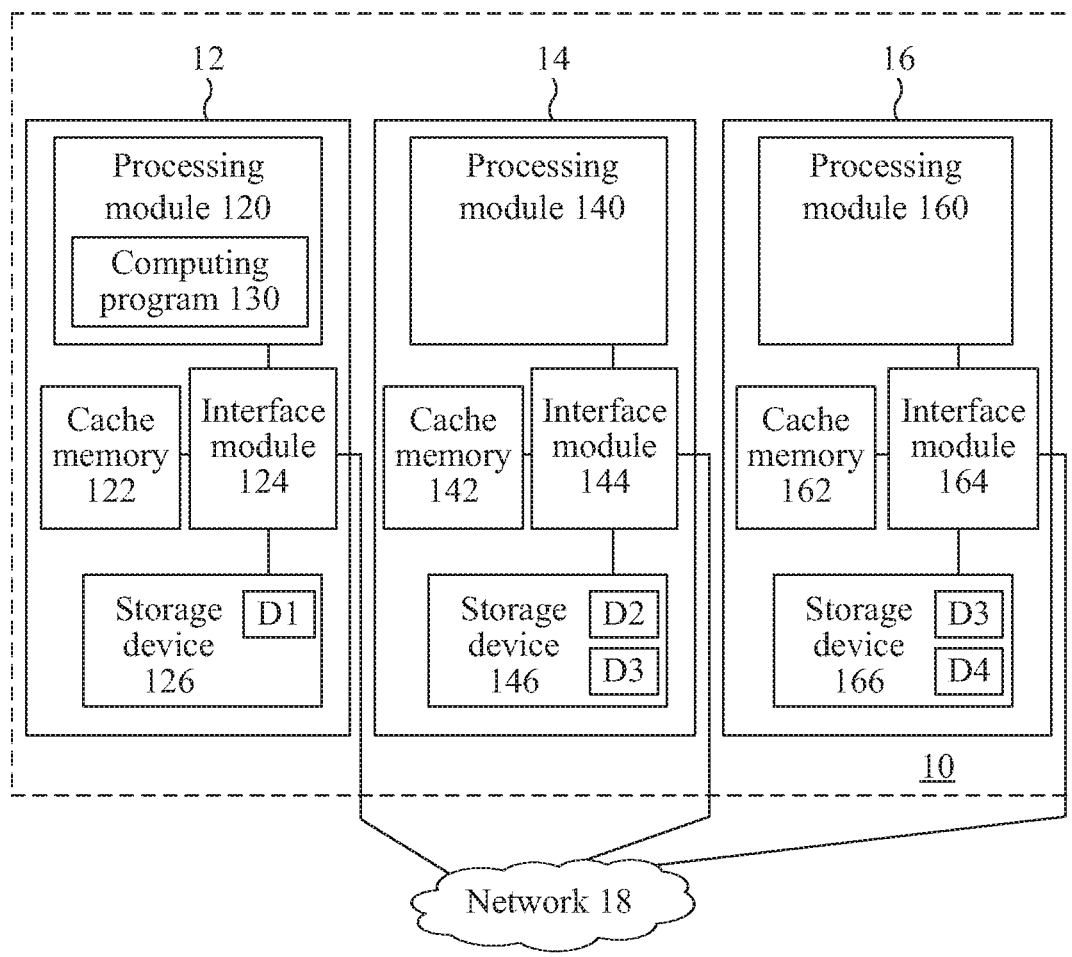
FIG. 1 is a block diagram illustrating the hyper-converged infrastructure according to an embodiment of the present disclosure.

Please refer to FIG. 1, which is a block diagram illustrating the hyper-converged infrastructure according to an embodiment of the present disclosure. In the embodiment, the hyper-converged infrastructure 10 includes three nodes 12, 14 and 16 in communication with each other through a network 18, e.g. an intranet or a LAN. As shown in FIG. 1, the node 12 includes a processing module 120, a cache memory 122, a data transmission interface module 124 and a storage device 126. The processing module 120 is electrically coupled to the data transmission interface module 124, and the data transmission interface module 124 is further electrically coupled to the cache memory 122 and the storage device 126. Similarly, the node 14 includes a processing module 140, a cache memory 142, a data transmission interface module 144 and a storage device 146. The processing module 140 is electrically coupled to the data transmission interface module 144, and the data transmission interface module 144 is further electrically coupled to the cache memory 142 and the storage device 146. Similarly, the node 16 includes a processing module 160, a cache memory 162, a data transmission interface module 164 and a storage device 166. The processing module 160 is electrically coupled to the data transmission interface module 164, and the data transmission interface module 164 is further electrically coupled to the cache memory 162 and the storage device 166. The circuitry of the three nodes 12, 14 and 16 is similar in the embodiment, but the nodes 14 and 16 may have different circuitry from the node 12 without departing from the present disclosure. The term "node" in the present disclosure may generally refer to any electronic device (e.g. workstation, personal computer) having the designated circuits. Further, the cache memory in any embodiment of the present disclosure refers to a storage device having a higher read/write speed than a hard disk drive. For example, the cache memory may be a storage device including at least one solid state disk (SSD) or storage class memory (SCM), or a disk array including at least one solid state disk or storage class memory.

When the node 12 needs to perform specific function, a computing program 130 providing the specific function is loaded in the processing module 120 and then the function of the computing program 130 is executed by the processing module 120. The operation of the computing program 130 may require additional data which are not contained in the computing program 130 wherein these data are referred computing data hereinafter. At this time, the computing program 130 will request the processing module 120 to prefetch the computing data from the correct storage area for later use.

Upon receiving the request for the computing data from the computing program 130, the processing module 120 starts to find out the storage location of the computing data. Generally speaking, the hyper-converged infrastructure 10 assigns at least one main controller (not shown) to maintain the storage locations of various data. The processing module 120 inquires of the main controller the storage location of the computing data. As shown in FIG. 1, the storage locations recorded in the main controller indicate that data D1 are stored in the node 12, data D2 are stored in the node 14, data D3 are stored in the nodes 14 and 16, and data D4 are stored in the node 16. For example, if the computing program 130 requires the data D2, the processing module 120 inquires of the main controller and is informed that the data D2 should be acquired from the node 14.

In one embodiment, while being informed that the data D2 are stored in the node 14, the processing module 120 sends a request for the data D2 to the node 14 through the data transmission interface module 124 and the network 18. After the data D2 are transmitted from the node 14 to the data transmission interface module 124, the data transmission interface module 124 stores the data D2 as received in the cache memory 122.

In another embodiment, if the computing program 130 requires the data D1, the processing module 120 inquires of the main controller and is informed that the data D1 are just stored in the same node 12. Hence, the processing module 120 directly acquires the data D1 from the storage device 126 through the data transmission interface module 124 and stores the data D1 in the cache memory 122. Then, when the computing program 130 requests for the data D1, the processing module 120 provides the data D1 to the computing program 130.

In another embodiment, the computing program 130 can request the processing module 120 to prefetch multiple files into the cache memory 122 at once and read the files one by one in the later step. If the file currently requested by the processing module 120 is just the file that the computing program 130 needs at the present time, the processing module 120 uses the data transmission interface module 124 to store the requested file in the cache memory 122 and also to provide the same requested file to the computing program 130. On the contrary, if the currently requested file is requested to be simply stored in the cache memory 122 and is not needed by the computing program 130 at the present time, the processing module 120 uses the data transmission interface module 124 to only prefetch the requested file into the cache memory 122 for later use. When the computing program 130 requests a file which has been stored in the cache memory 122, the processing module 120 controls the data transmission interface module 124 to directly provide the requested file (the designated file) stored in the cache memory 122 to the computing program 130 without the steps of inquiring of the main controller the storage location of the computing data and acquiring the computing data from another node.

Once being informed by the computing program 130 of that the computing data stored in the cache memory 122 can be discarded, the processing module 120 controls the data transmission interface module 124 to remove the computing data from the cache memory 122 in response to the informing action taken by the computing program 130 to free the space of the cache memory 122 for other data. According to the type of the computing program 130, the computing data may refer to a complete file, all files and subdirectory content in a directory or all files listed in a single file-listing document. In other words, the basic unit for caching is a file rather than a data block.

Figure 2:
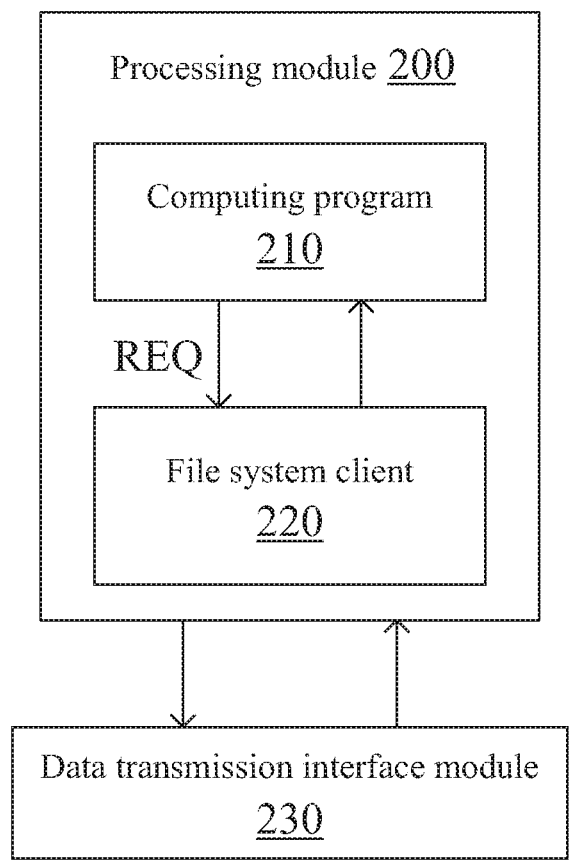
FIG. 2 is a block diagram showing the interactions between the computing program and the file system client operating in the processing module according to an embodiment of the present disclosure.

Specially, in addition to executing the computing program 130, the processing module 120 may further execute a file system client. Please refer to FIG. 2, which is a block diagram showing the interactions between the computing program and the file system client operating in the processing module according to an embodiment of the present disclosure. In the embodiment, the processing module 200 executes both the computing program 210 and the file system client 220. Bidirectional transmission is permitted between the computing program 210 and the file system client 220. Also, bidirectional transmission is permitted between the file system client 220 and the data transmission interface module 230. During the operation, the computing program 210 may use a request signal REQ to request the file system client 220 to prefetch one or more files into the cache memory (not shown), or to request the file system client 220 to provide one or more files to the computing program 210. The file system client 220 is told which file(s) should be prefetched according to the request signal REQ, and then acquires the designated file(s) through the data transmission interface module 230. If the request signal indicates an action of prefetching the designated file(s) into the cache memory, the file system client 220 will use the data transmission interface module 230 to store the designated file(s) in the cache memory. On the other hand, if the request signal indicates an action of providing the designated file(s) to the computing program 210, the file system client 220 will transmit the designated file(s) to the computing program 210.

By introducing the independent file system client 220 for data access, the computing program 210 can concentrate on processing data to achieve greater computing efficiency.

In a specific case, a machine learning training program could be selected as the computing program operating in the processing module. The implementation of the specific case is given in the following description.

Figure 3:
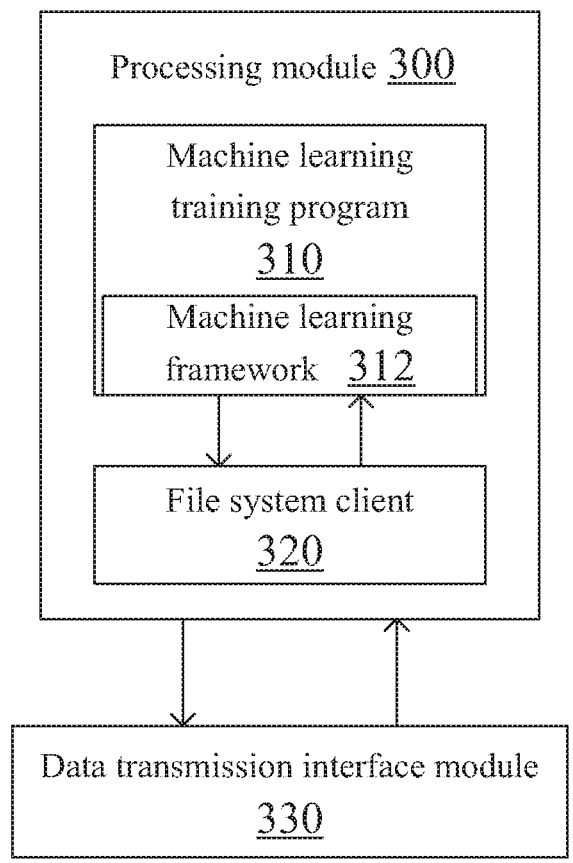
FIG. 3 is a block diagram illustrating that the computing program is a machine learning training program according to an embodiment of the present disclosure.

Please refer to FIG. 3, which is a block diagram illustrating that the computing program is a machine learning training program according to an embodiment of the present disclosure. In the embodiment, the processing module 300 executes the machine learning training program 310 and the file system client 320. The machine learning training program 310 is constructed based on a machine learning framework 312 so that the machine learning training program 310 can call the functions provided by the machine learning framework 312 to achieve the bidirectional transmission between the machine learning training program 310 and the file system client 320. Also, bidirectional transmission is permitted between the file system client 320 and the data transmission interface module 330, and bidirectional transmission is permitted between the data transmission interface module 330 and each cache memory (e.g. cache memory 122, 142, 162 of FIG. 1).

Concretely, the machine learning framework 312 of the present disclosure may be an existing machine learning framework, e.g. TensorFlow, with additional specific programming interfaces. For example, in addition to one Application Programming Interface (API) provided by the available machine learning framework, the machine learning framework 312 of the present disclosure further provides a cache population function and a cache discard function. While calling the cache population function of the machine learning framework 312, the machine learning training program 310 also provides a corresponding population parameter. The machine learning framework 312 requests the file system client 320 to prefetch corresponding data (e.g. a complete file, all files and subdirectory content in a designated directory or all files listed in a file-listing document specified in the population parameter) into the cache memory 122 in FIG. 1 according to the population parameter. Similarly, while calling the cache discard function of the machine learning framework 312, the machine learning training program 310 also provides a corresponding discard parameter. The machine learning framework 312 requests the file system client 320 to discard corresponding data (e.g. a complete file, all files and subdirectory content in a designated directory or all files listed in a file-listing document specified in the discard parameter) from the cache memory 122 in FIG. 1 according to the discard parameter.

In the embodiment, the machine learning training program 310 calls the functions provided by the machine learning framework 312 to make the machine learning framework 312 send a request signal (e.g. the request signal REQ in FIG. 2) to the file system client 320. The file system client 320 prefetches or discards the corresponding data according to the request signal. In particular, the file system client 320 will store a complete file, all files in a directory (including subdirectory, if any) or all files listed in a single file-listing document in the cache memory or discard the corresponding data from the cache memory according to the content of the request signal (e.g. file(s) specified in the population parameter or the discard parameter) to respond to the cache populating/discarding request from the machine learning framework 312 upon receiving the request signal.

Figure 4:
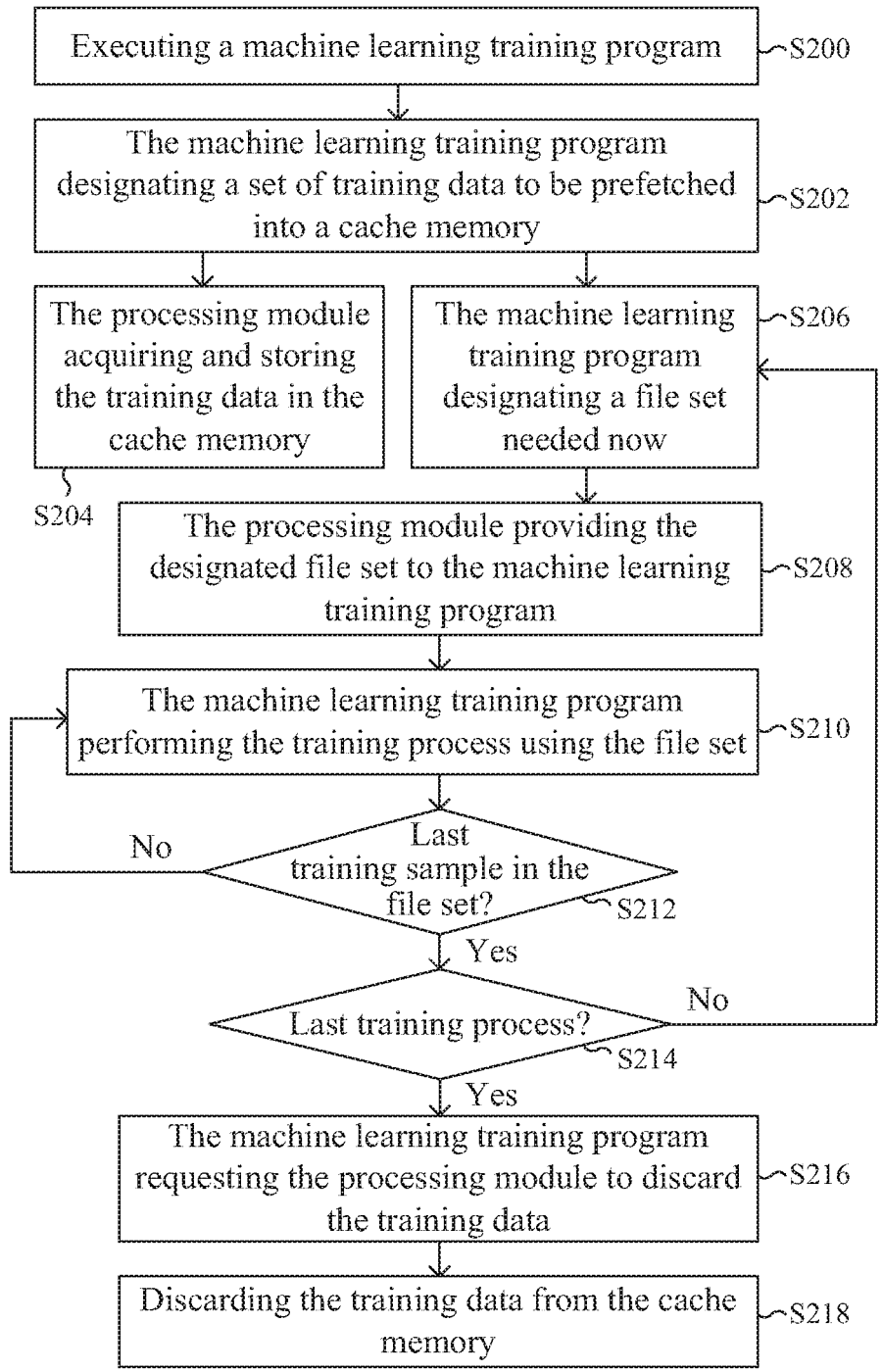
FIG. 4 is a flowchart showing a data caching method based on the hyper-converged infrastructure according to an embodiment of the present disclosure.

Please refer to FIG. 4, which is a flowchart showing a data caching method based on the hyper-converged infrastructure according to an embodiment of the present disclosure. In the embodiment, the data caching method is performed with a machine learning training program serving as the above-mentioned computing program to train a machine learning model. At first, the processing module executes the machine learning training program (step S200). Then, the machine learning training program designates a set of training data to be prefetched into the cache memory for use in a later training process (step S202). After that, the machine learning training program further designates a file set, among the set of training data, for use in the current training process (step S206), wherein the file set includes at least one file. Specially, in step S202, the machine learning training program indicates related information (e.g. filename or directory name) about the file(s) designated to be prefetched into the cache memory so that the processing module can acquire the corresponding file(s) according to the information and store the corresponding file(s) in the cache memory. Similarly, in step S206, the machine learning training program also indicates related information (e.g. file path) about the file set designated to be used in the current training process so that the processing module can provide the corresponding file(s) according to the information.

To respond to the request in step S202, the processing module takes a control action to acquire and store the set of requested training data in the cache memory (step S204). Similarly, to respond to the request in step S206, the processing module takes another control action to provide the designated file set, acquired from one node or the cache memory, to the machine learning training program (step S208). Subsequently, the machine learning training program orders the files of the file set to train the machine learning model (step S210). Each designated file may include a plurality of training samples. Every time any training sample has been used in the training process, the machine learning training program judges whether the current training sample is the last one in the current file set (step S212). If there exists any unused training sample, the method goes back to step S210 and the machine learning training program uses the next training sample in the training process. On the contrary, if all training samples have been used in the training process, the method advances to step S214 and the machine learning training program determines whether to request another file set of the training data previously stored in the cache memory to perform a next training process. If the next training process is in order, the method goes back to step S206 and the machine learning training program designates a next file set for use in the current training process. It is to be noted that a file set may be requested several times successively or intermittently, and the files are arranged in similar or different order in step S210. On the contrary, if the training data stored in the cache memory are no longer useful in training the machine learning model, the machine learning training program requests the processing module to discard the training data from the cache memory (step S216). Accordingly, the processing module removes the training data from the cache memory according to the discarding request (step S218).

In an embodiment, the training data are divided into parts, and each part includes at least one file (i.e. the file set previously mentioned). As described above, the machine learning training program requests the processing module to provide a part of the training data in step S206, and obtains the part of the training data in step S208 to perform the training process (step S210). After the training of the machine learning model with the content of the current file is finished, the machine learning training program judges whether there exists any unused file in the part of the training data needed in the training process. If it is determined in step S212 that there is unused file waiting to be used, the method goes back to step S210 to use the next file in the training process. On the contrary, if it is determined that there is no unused file needed in the training process, the method advances to step S214. In step S214, the machine learning training program judges whether to request another part of the training data previously stored in the cache memory by the processing module. If it is determined by the machine learning training program that there is any part of the training data waiting to be used, the method goes back to step S206 to acquire the next part of the training data. On the contrary, if it is determined by the machine learning training program that the training data stored in the cache memory are no longer useful, the method advances to steps S216 and S218 to discard the training data from the cache memory.

It is to be noted that the machine learning training program could fetch a file several times at different time points. The fetch order of the files and the number of fetch times of respective files stored in the cache memory are predetermined by the machine learning training program. For example, the machine learning training program provides that each file of the training data is fetched once during the entire training process, and the occasion for discarding the training data from the cache memory is the time point that the condition in step S214 is satisfied by repeating the entire training process a certain times.

Generally speaking, the machine learning training program could be executed by a central processor of a personal computer or a server serving as a node. Since training the machine learning model consumes a great deal of computing power, the machine learning training procedure may be shared with a graphic processing unit (GPU), if possible. In such case, the processing module of the present disclosure may include the central processor, the graphic processing unit and related program with specific functions executable in the processing module.

In conclusion, the data caching method, the node, the machine learning framework and the file system client based on the hyper-converged infrastructure according to the present disclosure directly prefetch the designated computing data into the cache memory or discard the designated computing data from the cache memory in response to the functions provided by the machine learning framework and called by the computing program. No complicated cache prediction mechanism is used in the data caching method and the node. Furthermore, because the computing data have been stored in the cache memory of the local node prior to being used, higher latency resulting from the data access through the network is avoided. To further speed up the access efficiency, the cache memory may be implemented by a cache device supporting the non-volatile memory express (NVMe) interface which has faster data access response. Therefore, the node can provide more computing power to the computing program, and provide better data caching service to the computing program executed in the node.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data caching method based on a hyper-converged infrastructure comprising a plurality of nodes wherein a computing node of the nodes executes a machine learning training program and prefetches computing data required for executing the machine learning training program from a data node of the nodes, the computing node comprising a cache memory having a higher read/write speed than a hard disk drive, the data caching method comprising steps of:

the machine learning training program designating the computing data to be prefetched before using the computing data as training samples to train a machine learning model;

the machine learning training program requesting the computing node to prefetch the computing data designated by the machine learning training program before using the computing data by calling a cache population function, provided by a machine learning framework to communicate with a file system client operating in the computing node, and providing a population parameter;

the machine learning framework requesting the file system client to store the computing data corresponding to the population parameter into the cache memory and the file system client storing the computing data in the cache memory in response to the cache population function wherein the computing data comprises a complete file, all files and subdirectory content in a directory or all files listed in a file-listing document so that the computing node acquires the computing data from the data node and stores the computing data in the cache memory as requested by the machine learning training program;

the machine learning training program receiving the computing data from the cache memory as the training samples to train the machine learning model;

the machine learning training program designating the computing data to be discarded when the machine learning training program determines that the computing data stored in the cache memory is no longer required for training the machine learning model;

the machine learning training program requesting the computing node to discard the computing data designated by the machine learning training program by calling a cache discard function provided by the machine learning framework and providing a discard parameter; and the machine learning framework requesting the file system client to discard the computing data corresponding to the discard parameter from the cache memory and the file system client discarding the computing data from the cache memory in response to the cache discard function wherein the computing data comprises a complete file, all files and subdirectory content in the directory or all files listed in the file-listing document so that the computing node discards the computing data from the cache memory as requested by the machine learning training program.

2. The data caching method according to claim 1, wherein the step of requesting the computing node to prefetch the computing data further comprises a step of:

the machine learning training program sending a request signal to the file system client operating in the computing node to request the file system client to prefetch the computing data into the cache memory according to the request signal.

3. The data caching method according to claim 1, wherein the step of requesting the computing node to discard the computing data further comprises a step of:

the machine learning training program sending a request signal to the file system client operating in the computing node to request the file system client to discard the computing data from the cache memory according to the request signal.

4. A node based on a hyper-converged infrastructure, comprising:

a processing module for executing a machine learning training program which reads and processes computing data and operating therein a file system client;

a data transmission interface module electrically coupled to the processing module; and a cache memory electrically coupled to the data transmission interface module, wherein the machine learning training program designates the computing data to be prefetched before using the computing data as training samples to train a machine learning model, requests the processing module to prefetch the computing data designated by the machine learning training program before using the computing data by calling a cache population function, provided by a machine learning framework to communicate with the file system client, and providing a population parameter to make the machine learning framework to request the file system client to store the computing data corresponding to the population parameter into the cache memory, and then the file system client stores the computing data in the cache memory in response to the cache population function wherein the computing data comprises a complete file, all files and subdirectory content in a directory or all files listed in a file-listing document so that the processing module acquires the computing data from a storage device through the data transmission interface module, and stores the computing data in the cache memory through the data transmission interface module, and receives the computing data from the cache memory as the training samples to train the machine learning model, wherein the machine learning training program designates the computing data to be discarded when the machine learning training program determines that the computing data stored in the cache memory is no longer required by the machine learning training program to train the machine learning model, and requests the processing module to discard the computing data designated by the machine learning training program by calling a cache discard function provided by the machine learning framework and providing a discard parameter to make the machine learning framework to request the file system client to discard the computing data corresponding to the discard parameter from the cache memory, and then the file system client discards the computing data from the cache memory in response to the cache discard function wherein the computing data comprises a complete file, all files and subdirectory content in a directory or all files listed in the file-listing document so that the processing module discards the computing data from the cache memory through the data transmission interface module as requested by the machine learning training program.

5. The node according to claim 4, wherein the storage device is located in the node.

6. The node according to claim 4, wherein the storage device and the node are separately located.

7. The node according to claim 4, wherein the cache memory comprises at least one solid state disk.

8. The node according to claim 7, wherein the cache memory comprises a disk array having the at least one solid state disk.

9. The node according to claim 4, wherein the cache memory comprises at least one storage class memory.

10. The node according to claim 9, wherein the cache memory comprises a disk array having the at least one storage class memory.

* * * * *